US010240534B2

(12) United States Patent
Sheil et al.

(10) Patent No.: US 10,240,534 B2
(45) Date of Patent: Mar. 26, 2019

(54) SPHERICAL BALL BEARING HOUSING

(71) Applicant: United Technologies Corporation, Farmington, CT (US)

(72) Inventors: Robert F. Sheil, Hartford, CT (US); Thomas Bruce Avis, Manchester, CT (US); Peter Tu, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 355 days.

(21) Appl. No.: 15/031,558

(22) PCT Filed: May 23, 2014

(86) PCT No.: PCT/US2014/039327
§ 371 (c)(1),
(2) Date: Apr. 22, 2016

(87) PCT Pub. No.: WO2015/060902
PCT Pub. Date: Apr. 30, 2015

(65) Prior Publication Data
US 2016/0258360 A1   Sep. 8, 2016

Related U.S. Application Data

(60) Provisional application No. 61/895,776, filed on Oct. 25, 2013.

(51) Int. Cl.
*F02C 7/20* (2006.01)
*F02C 7/22* (2006.01)
(Continued)

(52) U.S. Cl.
CPC ............... *F02C 7/222* (2013.01); *F02C 3/04* (2013.01); *F02C 7/06* (2013.01); *F02C 7/22* (2013.01);
(Continued)

(58) Field of Classification Search
CPC .... F02C 7/222; F02C 7/06; F02C 7/22; F02C 7/20; F16C 35/06
See application file for complete search history.

(56) References Cited

U.S. PATENT DOCUMENTS 2,686,401 A     8/1954   Newcomb
5,031,407 A *   7/1991   Zaremba ................. F23R 3/283
                                                    60/739

(Continued)

OTHER PUBLICATIONS

International Search Report for International Application No. PCT/US2014/039327; dated Sep. 16, 2014.
(Continued)

*Primary Examiner* — Steven Sutherland
(74) *Attorney, Agent, or Firm* — Cantor Colburn LLP

(57) ABSTRACT

A fuel supply manifold of a gas turbine engine, a method for assembling a fuel supply manifold for a gas turbine engine, and a gas turbine engine are disclosed. The fuel supply manifold for the gas turbine engine man include a plurality of fuel supply tubes, a fitting connecting at least two members of the plurality of fuel supply tubes, a bracket attached to the fitting, a bearing housing having a ball bearing, a bushing attached to a diffuser case of the gas turbine engine, wherein the bushing is surrounded by the ball bearing, and a removable fastener to connect the bearing housing to the bracket.

20 Claims, 7 Drawing Sheets

(51) Int. Cl.
    *F16C 35/06* (2006.01)
    *F02C 3/04* (2006.01)
    *F02C 7/06* (2006.01)
    *F23R 3/10* (2006.01)
    *F23R 3/28* (2006.01)
(52) U.S. Cl.
    CPC ............... *F16C 35/06* (2013.01); *F23R 3/10* (2013.01); *F23R 3/28* (2013.01); *F05D 2220/32* (2013.01); *F05D 2240/35* (2013.01); *F05D 2240/54* (2013.01); *F05D 2240/90* (2013.01)

(56) References Cited

U.S. PATENT DOCUMENTS

| | | | | |
|---|---|---|---|---|
| 5,211,005 | A * | 5/1993 | Hovnanian | F02C 7/22 60/739 |
| 2004/0050071 | A1 | 3/2004 | Bachelder et al. | |
| 2009/0025687 | A1 | 1/2009 | Fish | |
| 2009/0050743 | A1* | 2/2009 | Barbosa | B64C 17/10 244/135 A |
| 2010/0050645 | A1 | 3/2010 | Haggerty | |
| 2010/0146928 | A1 | 6/2010 | Morenko et al. | |
| 2010/0281881 | A1 | 11/2010 | Morenko | |
| 2013/0152590 | A1 | 6/2013 | Kojovic et al. | |
| 2014/0130477 | A1* | 5/2014 | Chen | F02C 3/22 60/39.463 |

OTHER PUBLICATIONS

Written Opinion for International Application No. PCT/US2014/039327; dated Sep. 16, 2014.
European Search Report for Application No. EP 14 85 5582.

* cited by examiner

SPHERICAL BALL BEARING HOUSING

TECHNICAL FIELD OF THE DISCLOSURE

The present disclosure relates to gas turbine engines and, more particularly, to a fuel manifold system for a gas turbine engine.

BACKGROUND OF THE DISCLOSURE

Gas turbine engines, such as those used to power modern commercial and military aircraft, include a combustor to burn a hydrocarbon fuel in the presence of pressurized air received from a compressor section upstream of the combustor. A fuel supply system may be mounted around the combustor, which is typically annular in shape, to provide the hydrocarbon fuel to a plurality of fuel injectors associated with the combustor of the gas turbine engine.

Such a fuel supply system may be attached to one or more fuel injectors which axially project the fuel into the combustor. The fuel injectors may be connected to one or more fuel supply manifolds which deliver the fuel to the fuel injectors. The fuel supply system may be an assembly of formed tubes which are cut, measured, assembled and then welded to fit around the combustor from fuel injector to fuel injector for that particular fuel injector distribution. In some other examples, the fuel distribution systems may be manufactured in multiple segments for a primary manifold and a secondary manifold. In such examples, the fuel supply manifolds may complicate the assembly process for the combustor. Further, such fuel supply manifolds may be difficult to manufacture and are may add unwanted, excess bulk to the gas turbine engine.

Such fuel supply manifolds are typically mounted to the diffuser case of the engine. However, mounting a fuel supply manifold to the exterior of the diffuser case causes a myriad of issues during production and assembly. For example, the fuel supply manifold may not be in a static position during all cycles of the gas turbine engine. This may be due to expansion/retraction of the diffuser case based on temperature changes within the combustor. Prior designs for fuel supply manifolds included a bearing and bushing combination at the points where the fuel supply manifold is attached to the diffuser case. The bearings and bushings used are a part of the manifold itself and allow for the fuel manifold to remain in place while the bushing slides multi-directionally through the bearing during expansion and/or retraction of the diffuser case. However, due to the stress caused by heat and the heat related expansion and retraction, the bearing and bushing combination may be susceptible to damage, component failure, and/or a loss of effectiveness. When said mechanisms fail in these fuel supply manifolds, the entire fuel manifold must be removed and repaired and/or replaced, causing more unwanted repair costs.

Because current fuel supply manifold designs require removing and/or replacing the entire fuel supply manifold from the diffuser case when a bearing structure fails, a need exists for a replaceable bearing mount mechanism which may mitigate costs associated with the replacing and/or removing the entire fuel supply manifold from the diffuser case.

SUMMARY OF THE DISCLOSURE

In accordance with one aspect of the disclosure, a fuel supply manifold assembly for a gas turbine engine is disclosed. The fuel supply manifold may include a plurality of fuel supply tubes, a fitting connecting at least two members of the plurality of fuel supply tubes, a bracket attached to the fitting, a bearing housing including a ball bearing, a bushing attached to a diffuser case of the gas turbine engine, wherein the bushing is surrounded by the ball bearing, and a removable fastener to connect the bearing housing to the bracket.

In a refinement, the bearing housing may further include a bearing race radially surrounding the ball bearing.

In a refinement, the ball bearing may be a spherical ball bearing

In a refinement, the bearing housing may further include a connective insert to accept the removable fastener.

In a further refinement, the connective insert may be a helicoil insert.

In a refinement, the ball bearing may be inserted into the bearing housing by press-fitting.

In a refinement, the fuel supply manifold may further include a second plurality of fuel supply tubes.

In a further refinement, the fitting may connect at least two members of the plurality of fuel supply tubes and connect at least two members of the second plurality of fuel supply tubes.

In a further refinement, the fitting may be a double-barrel fitting.

In a refinement, at least one member of the first plurality of tubes may be a straight tube.

In a refinement, at least one member of the first plurality of tubes may be a bended tube.

In accordance with another aspect of the disclosure, a gas turbine engine is disclosed. The gas turbine engine may include a fan section, a compressor section downstream of the fan section, a combustor downstream of the compressor section, and a turbine section downstream of the combustor section. The combustor may include a diffuser case and a fuel supply manifold assembly. The fuel supply manifold assembly may include a plurality of fuel supply tubes, a fitting connecting at least two members of the plurality of fuel supply tubes, a bracket attached to the fitting, a bearing housing, the bearing housing having a ball bearing, a bushing attached to the diffuser case, wherein the bushing is surrounded by the ball bearing, and a removable fastener to connect the bearing housing to the bracket.

In a refinement, the combustor section further comprises a fuel injector.

In a further refinement, the fuel injector is connected to the fitting.

In a further refinement, the fuel injector receives fuel from the fuel supply manifold, the fuel communicated to the fuel injector by the fuel circuit.

In a further refinement, the fuel injector is a duplex fuel injector.

In accordance with another aspect of the disclosure, a method for assembling a fuel supply manifold around a diffuser case of a gas turbine engine is disclosed. The method may include constructing a plurality of fuel supply tubes, connecting at least two members of the plurality of fuel supply tubes using a fitting, attaching a bracket to the fitting, connecting a bearing housing to the bracket using a removable fastener, the bearing housing comprising a ball bearing, and attaching a bushing to the diffuser case, wherein the bushing is surrounded by the ball bearing.

In a refinement, the method may further include assembling the bearing housing by press-fitting the ball bearing into the bearing housing.

In a refinement, the bracket is attached to the fitting by brazing.

In a refinement, the method may further include attaching the bushing to the bearing housing using a bushing fastener.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
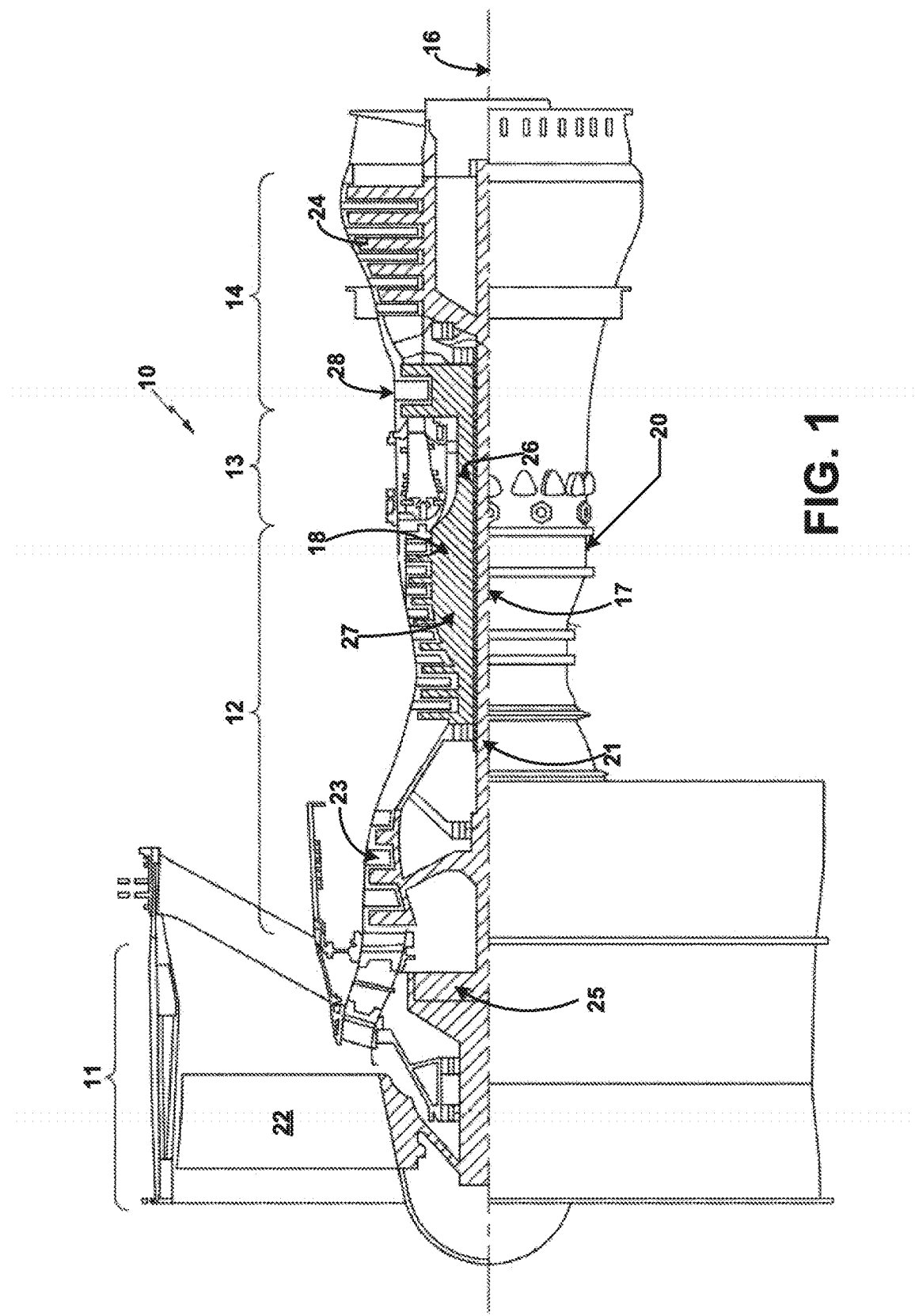
FIG. 1 is a cross-sectional view of a gas turbine engine constructed in accordance with the present disclosure.

Referring to the drawings, and with specific reference to FIG. 1, a gas turbine engine constructed in accordance with the present disclosure is generally referred to by reference numeral 10. Such a gas turbine engine 10 can be used for any number of different applications including, but not limited to, generation of aircraft thrust and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 10 may have a fan section 11, the fan section 11 drawing in ambient air and directing the ambient air to a compressor section 12. The incoming air is greatly compressed by the compressor section 12 and directed to a combustor 13 where it is mixed with fuel and combusted. The products of that combustion, in the form of very hot and expanding gases, are directed to a turbine section 14 shown to be downstream of the combustor section 13. The turbine section 14 and/or compressor section 12 may each be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 14, compressor section 12, and fan section 11 all revolve around a central engine axis 16.

Further, the gas turbine engine 10 may include a low spool 17 and a high spool 18 mounted for rotation about the central engine axis 16 relative to an engine case structure 20. The low spool 17 may include an inner shaft 21 that interconnects to a fan 22, a low pressure compressor 23 ("LPC") and a low pressure turbine 24 ("LPT"). The inner shaft 21 may drive the fan 22 directly or through a geared architecture 25 to drive the fan at a lower speed than the low spool 17. The high spool 18 may include an outer shaft 26 that interconnects a high pressure compressor 27 ("HPC") and high pressure turbine ("HPT") 28. The combustor 13 is arranged between the HPC 27 and the HPT 28. The inner shaft 21 and the outer shaft may be concentric and rotate about the central engine axis 16 which is collinear with their respective longitudinal axes.

Air within the gas turbine engine 10 may be compressed by the LPC 23 and/or the HPC 27. Said air may then be mixed with fuel and burned within the combustor 13 and then may be expanded throughout the HPT 28 and/or the LPT 24. The LPT 24 and/or the HPT 54 may rotationally drive the low spool 17 and the high spool 18, respectively, in response to the expansion of the fuel/air mixture.

Figure 2:
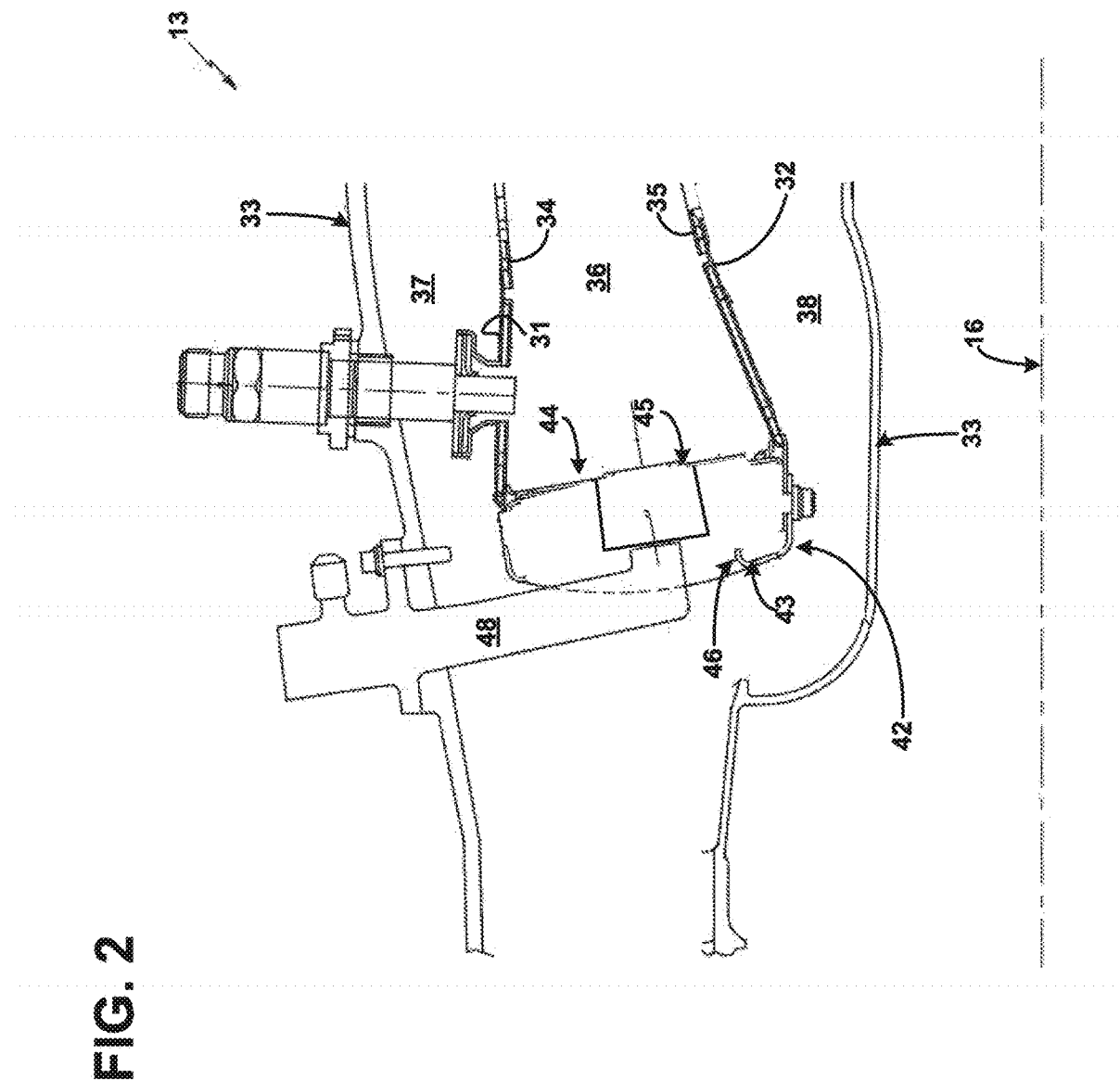
FIG. 2 is a partial cross-sectional view of a combustor of the gas turbine engine of FIG. 1 constructed in accordance with the present disclosure.

Returning to the combustor 13, FIG. 2 illustrates an example combustor 13 which, generally, may include an outer shell 31, an inner shell 32, and a diffuser case 33, the diffuser case 33 being a circumferential enclosure. An outer liner 34 may be radially inward of the outer shell 31, while an inner liner 35 may be radially outward of the inner shell 32. The outer liner 34 and the inner liner 35 may be shaped such that a combustion chamber 36 is defined therein. In some examples, the combustion chamber 36 is, generally, annularly shaped. The outer shell 31 may be spaced radially inward from the diffuser case 33 to define an annular outer plenum 37. Further, the inner shell 32 may be spaced radially outward from the diffuser case 33, defining an annular inner plenum 38.

The outer liner 34 and the inner liner 35 may contain the products of combustion mixture so as to direct them downstream toward the turbine section 14. To protect the combustor 13 from effects of the hot, gaseous, combustion mixture, the outer liner 34 and inner liner 35 may be manufactured from heat resilient metals and alloys and be attached with fasteners such as, but not limited to, studs and/or nuts to the outer and inner shells 31 and 32, respectively, so as to facilitate periodic maintenance and replacement.

The combustor may also include a forward assembly 42 immediately downstream of the compressor section 12 to guide compressed airflow to the combustor 13. The forward assembly may include an annular hood 43, a bulkhead assembly 44, and a plurality of swirlers 45. The annular hood 43 may extend radially between the forward ends of the inner liner 35 and the outer liner 34. A plurality of circumferentially distributed hood ports 46 may accommodate a respective plurality of fuel injectors 48 and the hood ports 46 may direct compressed air into the forward end of the combustion chamber 36 through an associated swirler 45. Each swirler 45 may be circumferentially aligned with its respective hood port 46 to project through the bulkhead assembly 44.

The forward assembly 42, the inner liner 35, and the outer liner 34 may introduce core combustion air into the forward end of the combustion chamber 36 while the remainder of the combustion air enters the annular outer plenum 37 and the annular inner plenum 38. The plurality of fuel injectors 48 and the plurality of swirlers 45 may facilitate the generation of a blended fuel-air mixture that supports combustion in the combustion chamber 36. Created combustion gases may flow downstream to the turbine section 14 of the gas turbine engine 10.

Figure 3:
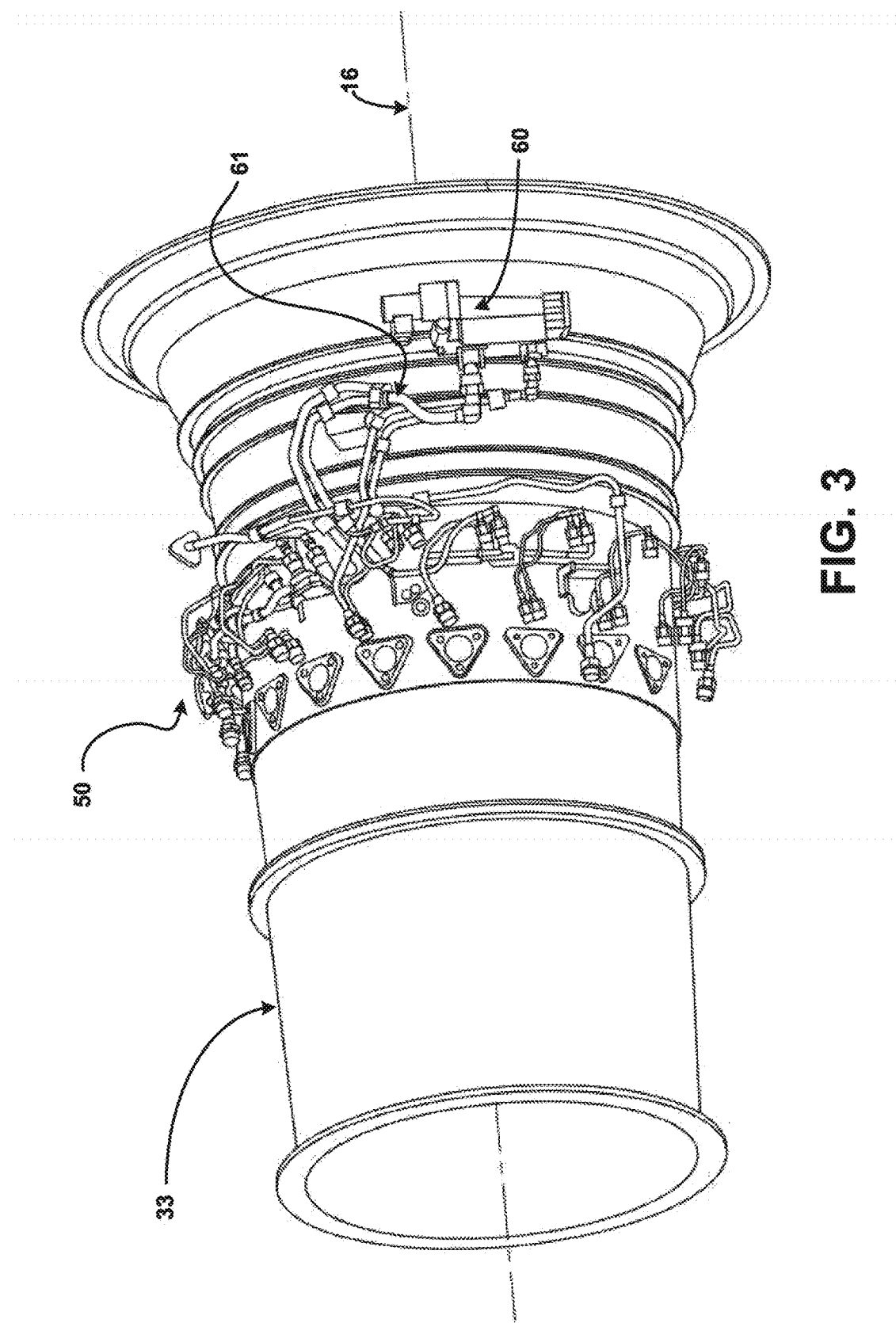
FIG. 3 is a perspective view of a fuel supply manifold mounted to a diffuser case.

As described above in reference to the combustor 13, a diffuser case 33 may surround the combustor 13. Referring to FIG. 3, a fuel supply manifold 50 may be mounted to the diffuser case 30. In some examples, the fuel supply manifold 50 may be divided into multiple segments; such segments may be linked and share a common fuel circuit. The fuel supply manifold 50 may receive fuel from a main fuel valve 60, via a fuel manifold subassembly 61, and the fuel supply manifold 50 may supply the fuel to the plurality of fuel injectors 48. The fuel manifold subassembly 61 may communicate fuel to one or more segments of the fuel manifold assembly 50 and may also permit a complete fuel drain from one or more segments of the fuel manifold assembly 50.

Figure 4:
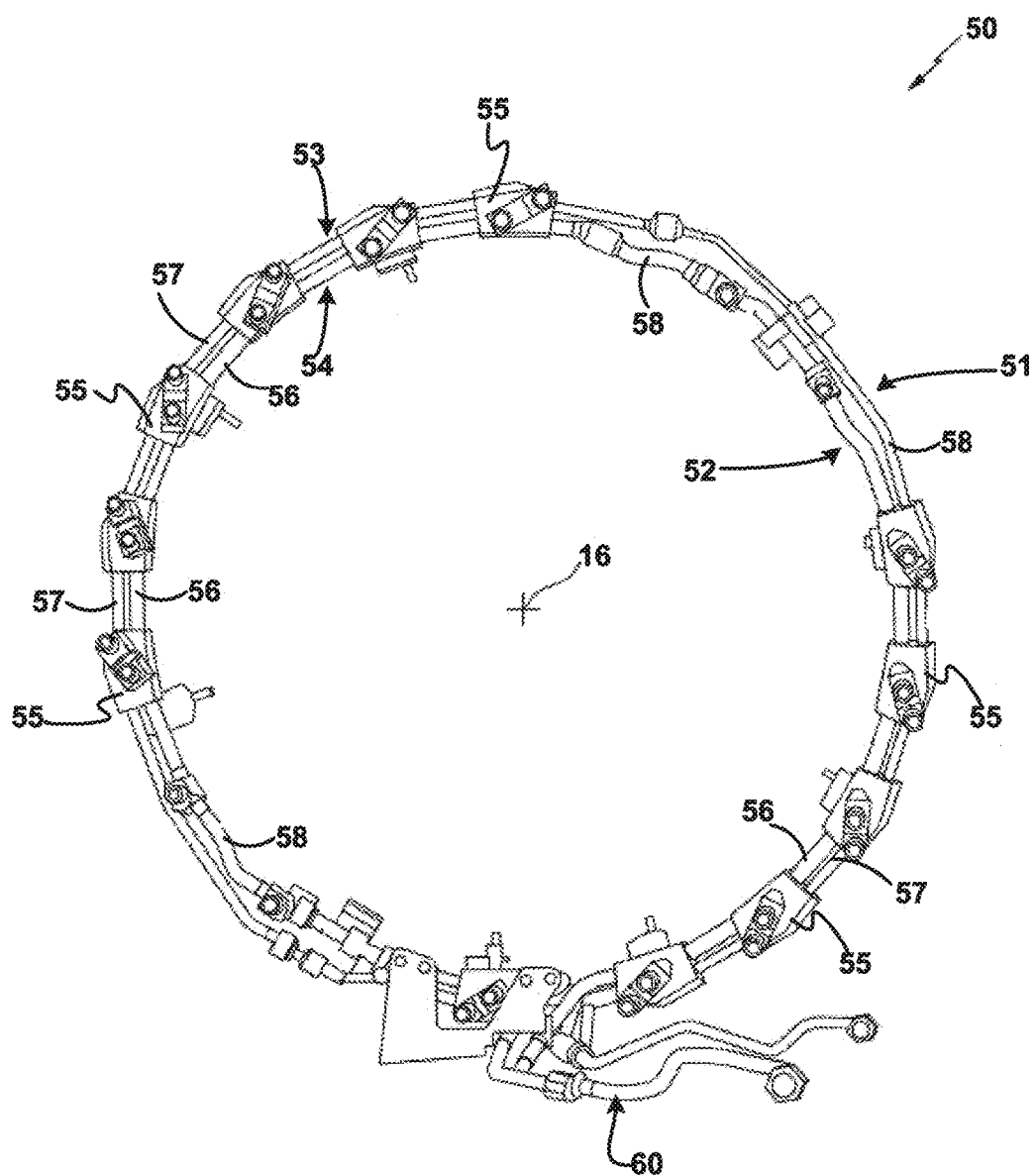
FIG. 4 is a front view of a fuel supply manifold.

Turning to FIG. 4, an example fuel supply manifold 50 is shown independent of a diffuser case 33 or the gas turbine engine 10 as a whole. The fuel supply manifold 50 may include a primary fuel circuit 51 and a secondary fuel circuit 52. The primary fuel circuit 51 and secondary fuel circuit 52 may include, respectively, a plurality of primary fuel tubes 53 and a plurality of secondary fuel tubes 54. As such, a primary fuel flow of the fuel supply manifold 50 may flow through the primary fuel circuit 51 by way of the plurality of primary fuel tubes 53. Likewise, a secondary fuel flow of the fuel supply manifold 50 may flow through the secondary fuel circuit 52 by way of the secondary fuel tubes 54. Both the primary fuel circuit 51 and secondary fuel circuit 52 may be supported and/or connected by a plurality of fittings 55.

The plurality of primary fuel tubes 53 may include a plurality of primary straight tubes 57. Likewise, the plurality of secondary fuel tubes 54 may include a plurality of secondary straight tubes 56. The primary and secondary straight tubes 57, 56 may interconnect with two or more fittings 55, wherein the fittings 55 provide the angular interface between the straight tubes 57, 56 to circumferentially surround the diffuser case 33. As such, the fittings 55 may angle the primary and secondary straight tubes 57, 56 to form a ring formed to straight segments. The use of straight tubes 57, 56 may limit the need for using bent tubes 58 when constructing the fuel supply manifold 50. Using straight tubes 57, 56 may be preferable to using bent tubes 58 due to a lower cost of fabrication for the straight tubes.

In certain embodiments, the fittings 55 may be double-barrel fittings, wherein the fittings provide ports for the primary fuel circuit 51 and the secondary fuel circuit 52 via the tubes therein. The fittings 55 may receive straight tubes 57, 56 and/or any bent tubes 58 included in the primary fuel circuit 51 and/or the secondary fuel circuit 52. Fuel flows associated with both the primary fuel circuit 51 and the secondary fuel circuit 52 may be communicated, separately, through the fittings 55 to fuel injectors 48 respectively associated with the fittings 55. In some examples, the fittings 55 are double barreled and communicate with duplex fuel injectors 48. Alternatively, one or more of the fittings 55 may be single barreled and may provide fuel to a simplex fuel injector 48.

Figure 5:
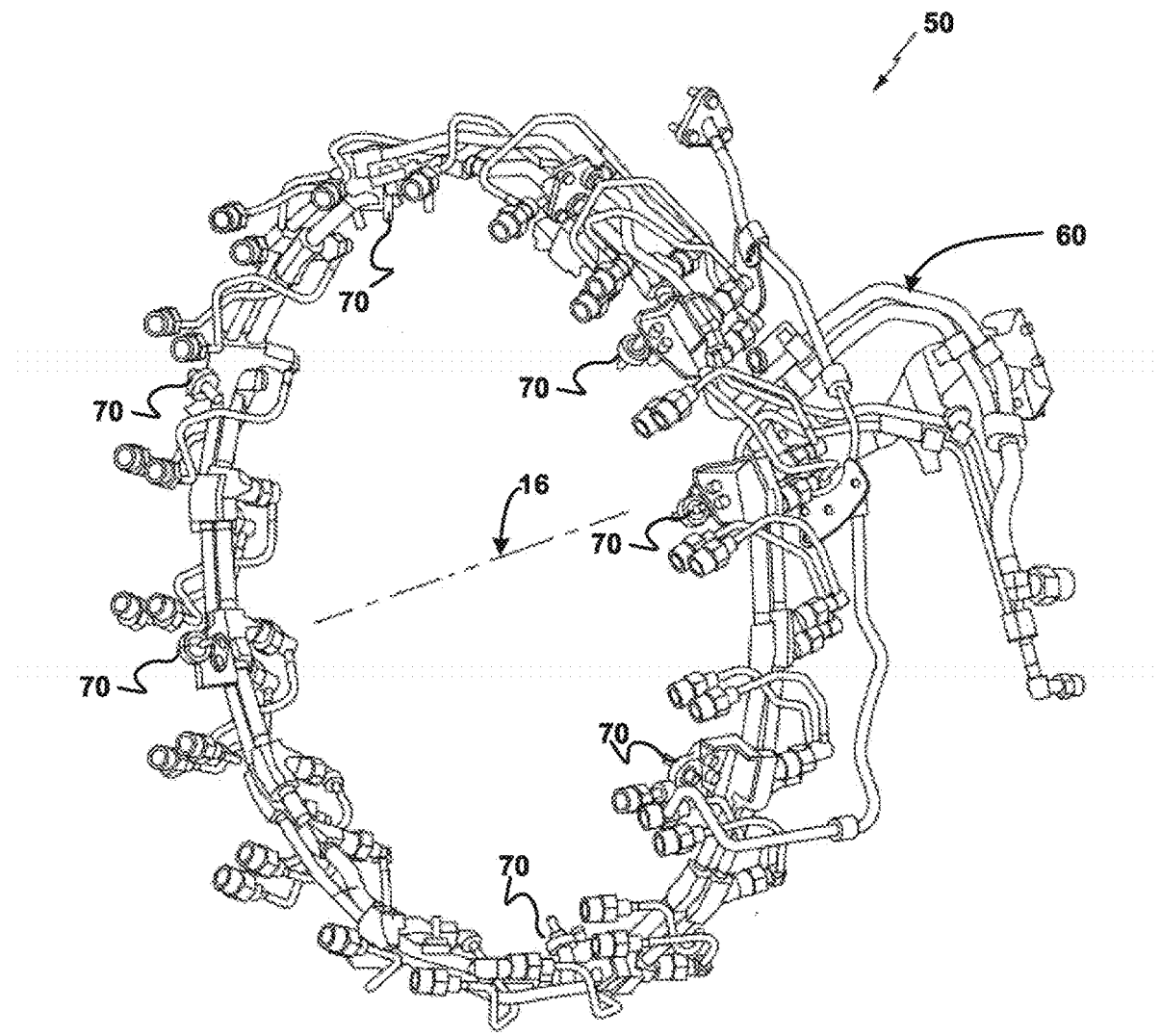
FIG. 5 is a perspective view of a fuel supply manifold.
Figure 6:
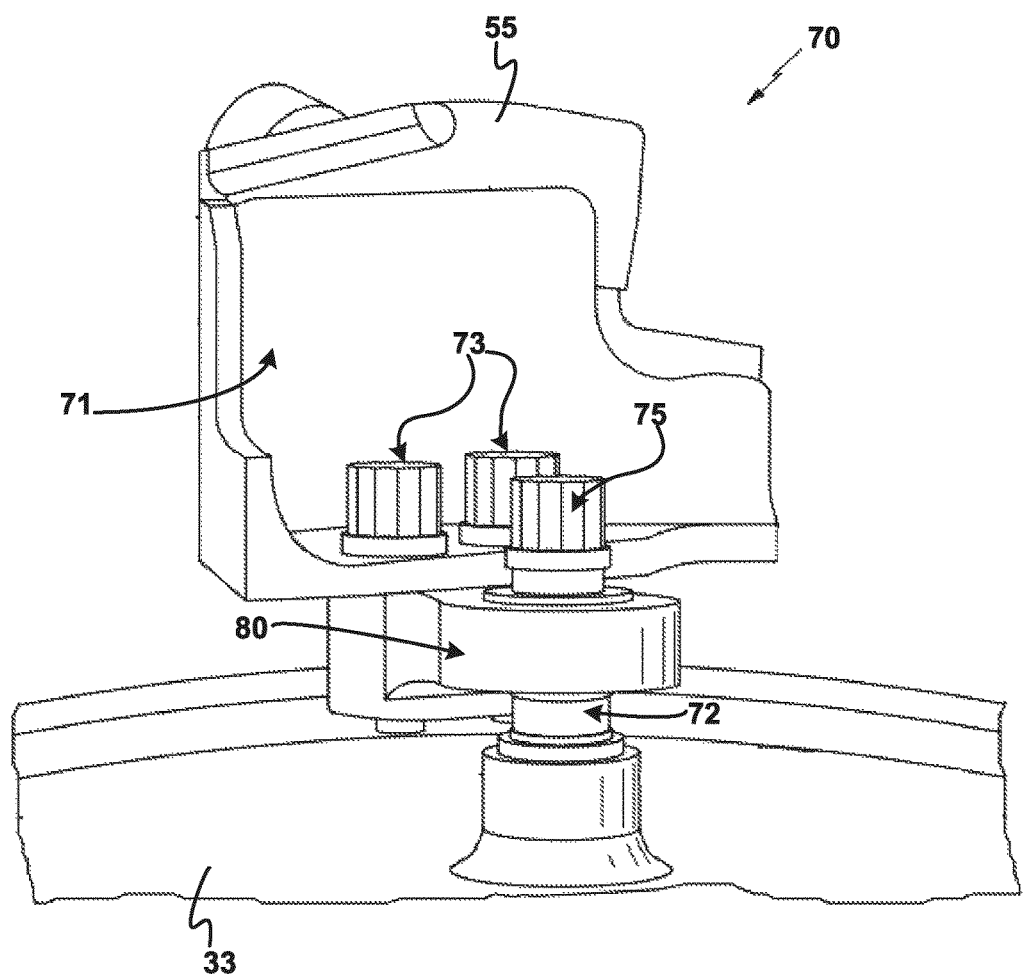
FIG. 6 is a rear perspective view of one of a plurality of mounts for mounting the fuel supply manifold to a diffuser case using a bearing housing according to the present disclosure.

As shown in the perspective view of the fuel supply manifold 50 in FIG. 5, the fuel supply manifold may include a series of mounts 70. The mounts 70 may be used to attach the fuel supply manifold to the diffuser case 33. Further, FIG. 6 shows a perspective view of a mount 70. The mount 70 may include a bracket 71 to attach a fitting 55 to the mount 70. The fitting 55 may be attached to the bracket 71 by a fastening means (e.g., bolting the fitting 55 to the bracket 71). Alternatively, the fitting 55 may be attached to the bracket 71 by brazing.

Figure 7:
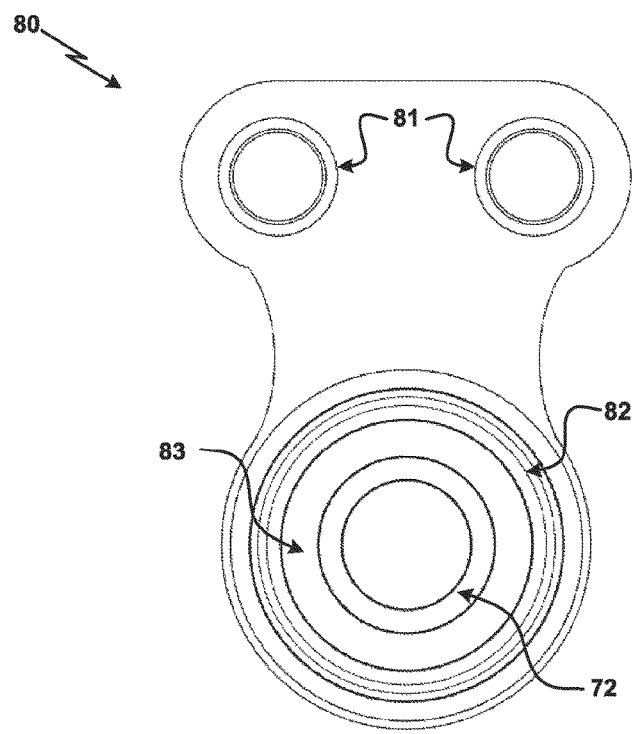
FIG. 7 is a top view of a bearing housing for use with a mount for mounting the fuel supply manifold according to the present disclosure.
Figure 8:
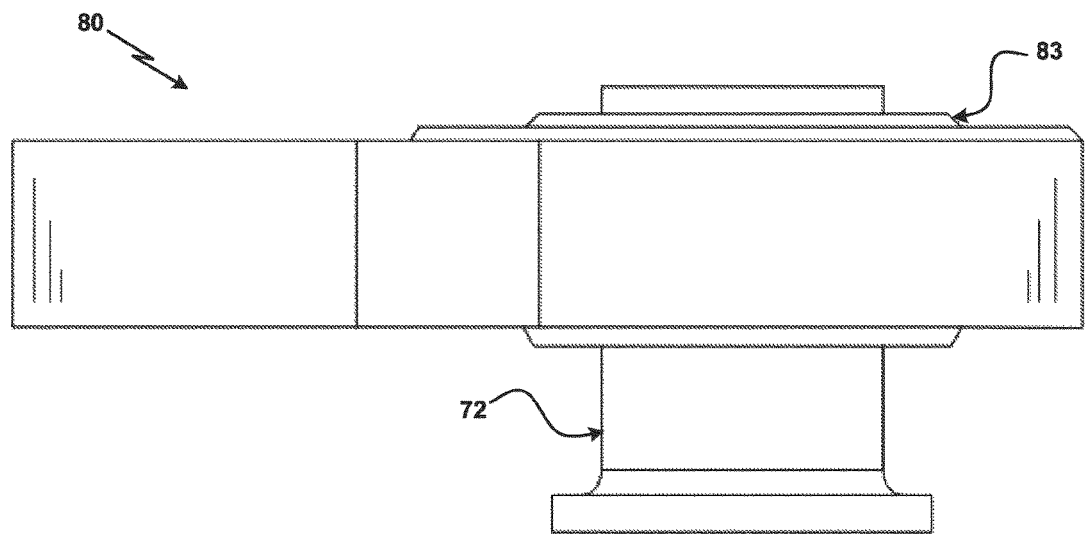
FIG. 8 is a side view of a bearing housing for mounting the fuel supply manifold according to the present disclosure.

The bracket 71 may be attached to the diffuser case 33 using a ball bearing housing 80 operatively associated with a mount bushing 72, the mount bushing 72 being attached to the diffuser case 33. With additional reference to features of the bearing housing 80 shown in FIGS. 7 and 8, the bearing housing 80 may be attached to the bracket 71 by using removable fasteners 73 (e.g., bolts). The removable fasteners 73 may insert the bearing housing 80 at one or more inserts 81. The inserts 81 may be helicoil inserts (e.g., a 0.250-28 thread helicoil insert) which may accept a removable fastener 73 having a threading accepted by the insert 81.

The bearing housing 80 may include a spherical ball bearing 83 radially surrounded by a bearing race 82. The spherical ball bearing 83 may be positioned around the bushing 72. In some examples, the spherical ball bearing 83 and/or the bearing race 82 may be mechanically pressed into the bearing housing 80.

Using spherical ball bearings, such as the spherical ball bearing 83, allows the bushing 72 to move rotationally, radially inward, and radially outward. For example, during a cycle of the gas turbine engine, the combustor 30 may expand and/or retract, causing the attached bushing 72 to move radially outward and/or inward. In such examples, the spherical ball bearing 83 allows the bushing 72 to slide outwardly and/or inwardly through housing 80. This, in turn, decreases or eliminates displacement of the fuel supply manifold 50. The ball bearing 83 may also absorb some energy associated with a cycle of the gas turbine engine 10 rather than exposing said heat to the fuel manifold system 50 as a whole. The bushing 72 may be secured to the bearing housing using a bushing fastener 75 which may be removable similarly to the removable fasteners 73.

The ball bearing 83 may be subjected to wear from use over time and/or wear from heat and other thermodynamic affects associated with a cycle of the gas turbine engine 10. As such, a need exists to construct the fuel supply manifold 50 in a manner which allows for easy repairability by using a removable ball bearing 83 and bearing housing 80. Therefore, the bearing housing 80 is fabricated independently of the fuel supply manifold 50; thereby separating the bearing housing(s) 80 structures from the fuel supply manifold 50 itself. Such independent fabrication allows for replacement of the bearing elements of a fuel manifold system without having to replace the entire fuel manifold system itself.

INDUSTRIAL APPLICABILITY

From the foregoing, it can be seen that the technology disclosed herein has industrial applicability in a variety of settings such as, but not limited to, ball bearing housings for a fuel supply manifold of a gas turbine engine. The gas turbine engine may be used in conjunction with an aircraft for generating thrust, or for land-based applications for generating power. The teachings of the present disclosure may provide cost savings and easier repair by constructing the fuel supply manifold with multiply fabricated parts. Creating a fuel supply manifold having multiply fabricated parts allows for the bearing housing to be easily replaced. Because replacing an entire fuel supply manifold may be costly and labor intensive, this improvement over the prior art may save costs due to the reduction in component replacement and repair costs/time.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the spirit and scope of the claims as well.

What is claimed is:

1. A fuel supply manifold assembly for a gas turbine engine, the fuel supply manifold assembly comprising:
   a plurality of fuel supply tubes;
   a fitting connecting at least two members of the plurality of fuel supply tubes;
   a bracket attached to the fitting;
   a bearing housing including a ball bearing;
   a bushing configured to attach to a diffuser case of the gas turbine engine, wherein the bushing is surrounded by the ball bearing; and
   a removable fastener to connect the bearing housing to the bracket.

2. The fuel supply manifold assembly of claim 1, wherein the bearing housing further includes a bearing race radially surrounding the ball bearing.

3. The fuel supply manifold assembly of claim 1, wherein the ball bearing is a spherical ball bearing.

4. The fuel supply manifold assembly of claim 1, wherein the bearing housing further comprises a connective insert to accept the removable fastener.

5. The fuel supply manifold assembly of claim 4, wherein the connective insert is a helicoil insert.

6. The fuel supply manifold assembly of claim 1, wherein the ball bearing is inserted into the bearing housing by press-fitting.

7. The fuel supply manifold assembly of claim 1, further comprising a second plurality of fuel supply tubes.

8. The fuel supply manifold assembly of claim 7, wherein the fitting connects at least two members of the plurality of fuel supply tubes and connects at least two members of the second plurality of fuel supply tubes.

9. The fuel supply manifold assembly of claim 7, wherein the fitting is a double-barrel fitting.

10. The fuel supply manifold assembly of claim 1, wherein at least one of the at least two members of the plurality of fuel supply tubes is a straight tube.

11. The fuel supply manifold assembly of claim 1, wherein at least one of the at least two members of the plurality of fuel supply tubes is a bent tube.

12. A gas turbine engine, comprising:
   a fan section;
   a compressor section downstream of the fan section;
   a combustor downstream of the compressor section, the combustor comprising:
   a diffuser case; and
   a fuel supply manifold assembly comprising:
      a plurality of fuel supply tubes;
      a fitting connecting at least two members of the plurality of fuel supply tubes;
      a bracket attached to the fitting;
      a bearing housing including a ball bearing;
      a bushing attached to the diffuser case, wherein the bushing is surrounded by the ball bearing; and
      a removable fastener to connect the bearing housing to the bracket; and
   a turbine section downstream of the combustor section.

13. The gas turbine engine of claim 12, wherein the combustor section further comprises a fuel injector.

14. The gas turbine engine of claim 13, wherein the fuel injector is connected to the fitting.

15. The gas turbine engine of claim 13, wherein the fuel injector receives fuel from the fuel supply manifold assembly, the fuel communicated to the fuel injector by a fuel circuit.

16. The gas turbine engine of claim 13, wherein the fuel injector is a duplex fuel injector.

17. A method for assembling a fuel supply manifold around a diffuser case of a gas turbine engine, the method comprising:
   constructing a plurality of fuel supply tubes;
   connecting at least two members of the plurality of fuel supply tubes using a fitting;
   attaching a bracket to the fitting;
   connecting a bearing housing to the bracket using a removable fastener, the bearing housing including a ball bearing; and
   attaching a bushing to the diffuser case, wherein the bushing is surrounded by the ball bearing.

18. The method according to claim 17, further comprising assembling the bearing housing by press-fitting the ball bearing in to the bearing housing.

19. The method according to claim 17, wherein the bracket is attached to the fitting by brazing.

20. The method according to claim 17, further comprising attaching the bushing to the bearing housing using a bushing fastener.

* * * * *